United States Patent
Niemasz, Jr. et al.

(10) Patent No.: US 8,837,350 B2
(45) Date of Patent: Sep. 16, 2014

(54) METHOD AND APPARATUS FOR CONCERTED SIGNAL TRANSMISSION ON MULTIPLE ANTENNAS

(75) Inventors: John W. Niemasz, Jr., Fredon, NJ (US); Walid Elias Nabhane, Bedminster, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 596 days.

(21) Appl. No.: 12/827,791

(22) Filed: Jun. 30, 2010

(65) Prior Publication Data

US 2011/0158205 A1    Jun. 30, 2011

Related U.S. Application Data

(60) Provisional application No. 61/274,320, filed on Aug. 14, 2009, provisional application No. 61/358,359, filed on Jun. 24, 2010.

(51) Int. Cl.

| | |
|---|---|
| *H04B 7/185* | (2006.01) |
| *H04B 7/06* | (2006.01) |
| *H04W 52/42* | (2009.01) |
| *H04W 4/00* | (2009.01) |
| *H04W 72/04* | (2009.01) |
| *H04W 52/14* | (2009.01) |

(52) U.S. Cl.
CPC .............. *H04W 52/42* (2013.01); *H04W 72/04* (2013.01); *H04B 7/0669* (2013.01); *H04W 52/146* (2013.01)
USPC .......................................... 370/318; 370/334

(58) Field of Classification Search
None
See application file for complete search history.

(56) References Cited

U.S. PATENT DOCUMENTS

| | | | |
|---|---|---|---|
| 7,307,977 B1 * | 12/2007 | Eran et al. ...................... 370/342 |
| 2004/0053612 A1 * | 3/2004 | Janardhanan ................. 455/434 |
| 2005/0197080 A1 * | 9/2005 | Ulupinar et al. .............. 455/135 |
| 2007/0135166 A1 * | 6/2007 | Ding et al. ..................... 455/561 |
| 2007/0287382 A1 * | 12/2007 | Catreux-Erceg et al. .... 455/63.1 |
| 2008/0063116 A1 * | 3/2008 | Yokoyama ..................... 375/299 |
| 2008/0279264 A1 * | 11/2008 | Desai et al. ................... 375/220 |
| 2009/0036081 A1 * | 2/2009 | Catreux et al. ............. 455/277.1 |
| 2010/0074210 A1 * | 3/2010 | Gaal et al. ..................... 370/329 |
| 2012/0113878 A1 * | 5/2012 | Yu et al. ........................ 370/311 |

OTHER PUBLICATIONS

"Transmit Diversity for F-DPCH," Agenda item 9 3GPP TSG RAN WG1 Meeting #57bis, (Jun. 29-Jul. 3, 2009), Tdoc R1-092615 pp. 1-2.
3GPP TS 24.211, V8.0.0 (Mar. 2008), "Physical Channels and Mapping of Transport Channels onto Physical Channels (FDD)," Release 8—pp. 1-54.

* cited by examiner

*Primary Examiner* — Eunsook Choi
(74) *Attorney, Agent, or Firm* — Harness, Dickey & Pierce

(57) ABSTRACT

A communication method is provided for use in a network in which users are allocated respective symbol positions within timeslots for communication to the respective users from a base station. A signal periodically transmitted from at least two antennas of the base station to a user terminal represents coded information. The signal is transmitted within each of a plurality of periodic timeslots. Within each timeslot, each antenna transmits the same coded information only during an assigned symbol position. The symbol positions assigned to the respective antennas are separated in time according to a specified sequential spacing of symbol positions within the timeslot.

22 Claims, 4 Drawing Sheets

METHOD AND APPARATUS FOR CONCERTED SIGNAL TRANSMISSION ON MULTIPLE ANTENNAS

CROSS REFERENCE TO RELATED APPLICATIONS

This application claims priority to U.S. Provisional. Patent Application No. 61/358,359 entitled Method and Apparatus for Concerted Signal Transmission on Multiple Antennas, filed Jun. 24, 2010, which is incorporated herein by reference for all purposes. This application further claims priority to U.S. Provisional Patent Application No. 61/274,320 entitled Method and Apparatus for Concerted Signal Transmission on Multiple Antennas, filed Aug. 14, 2009, which is incorporated herein by reference for all purposes.

FIELD OF THE INVENTION

The invention relates to forward link transmissions from multiple antennas in wireless systems, and more particularly to the transmission of control signals in Third and Fourth Generation networks using CDMA, WCDMA, or UMTS technology or the like.

ART BACKGROUND

Various multiple-antenna systems are known. For example, there are known systems that use transmit diversity, and there are many known schemes for multiple-input multiple-output (MIMO) transmission. It is typical in such systems to share the transmission power approximately equally among the various transmit antennas. For example, such equidistribution of power is advantageous in a two-antenna system because it makes it possible to use a balanced pair of power amplifiers, and to load the power amplifiers equally. FIG. 1, for example, schematically shows a forward-link transmission from a base station 10 to a mobile station 20. The transmission is made from an antenna array consisting of a main antenna 30 and a diversity antenna 40.

Certain problems may arise, however, when two (or more) base station antennas are used simultaneously for signal transmission. In such circumstances, there may be locations where the signals from the respective antennas undergo destructive interference. If mobile stations (or other terminals) happen to be at such locations, the result may be poor reception, leading to various consequences that are detrimental to the performance of the network.

For example, the $3^{rd}$ Generation Partnership Project (3GPP) has defined a channel referred to as the fractional dedicated physical channel (F-DPCH), useful inter alia for transmitting uplink power control signals from the base station to the mobile stations in Wideband CDMA (WCDMA) networks. (In the following discussion, we will follow CDMA conventions to the extent of using the term "UE"—user equipment—to denote mobile stations and other user terminals.) One motivation for the F-DPCH is the conservation of downlink channelization codes. That is, users recover their own destined signals by despreading, using their own assigned orthogonal or quasi-orthogonal codes. But if a distinct code were assigned to each user for sending control messages on a forward-link dedicated channel, the remaining pool of available codes might be too small to serve the user population. The F-DPCH addresses this problem by reusing the same code among multiple users. Users who share the same code are configured by the network to have different frame timing.

The control information transmitted on the F-DPCH is a single symbol, i.e. the transmission power control (TPC) command, transmitted at regular intervals. The timing of these transmissions as defined, for example, in 3GPP 25.211, is illustrated in FIG. 2. Turning to FIG. 2, it will be seen that the illustrated example, one radio frame has a duration of 10 ms and comprises fifteen slots, numbered 0 to 14. Each slot has a duration of 2560 chips, each chip having a duration of 0.260 microseconds. Each slot is subdivided into a plurality of fields, each of which may potentially be used for transmitting a TPC symbol, i.e., a power-control command TPC_cmd having $N_{TPC}$ bits.

In current implementations, it is possible for multiple users to share the same F-DPCH, i.e., the same scrambling code, channelization code, and time alignment, provided that they use different slot formats. A "slot format" in this regard means a selection of a particular one of the fields within the slot in which to transmit the TPC symbol.

In the figure, the fields that are not used for transmitting the power-control command to a designated user, i.e. the fields shown as comprising a total length of $N_{OFF1}+N_{OFF2}$ bits, are labeled "Tx OFF". By this is meant that there is no transmission in those fields for the designated user. If no other users are sharing the same F-DPCH, then the channel will be silent during the $N_{OFF1}+N_{OFF2}$ symbol intervals. However, as noted, those symbol intervals may be used for sending TPC symbols to other users that are sharing the same F-DPCH.

It is significant that because the conventional manner of transmitting on the F-DPCH involves sending individual symbols, it precludes the use, of space-time block-coding-based transmit antenna diversity (STTD), because such techniques must operate on pairs (Or greater-numbers) of distinct symbols.

In WCDMA as currently practiced, for example, when transmit diversity is enabled, the same F-DPCH symbol is transmitted simultaneously from both antennas of a two-antenna base station array. As noted, this may lead to destructive interference in some locations. As a consequence, some UEs may experience poor signal-to-noise ratio on the F-DPCH, which may possibly result in loss of synchronization. (Current WCDMA standards define the synchronization criterion with reference to the quality of the F-DPCH.)

There are, in fact, closed loop transmit diversity schemes which avoid the problem of destructive interference by dynamically adapting the phase of the transmissions from at least one of the antennas. However, these schemes also suffer from certain drawbacks that may make them disadvantageous under some circumstances. One drawback is that additional complexity is needed to support the feedback path for the antenna phases. A second drawback is that the phase control might not work well when the coherence time of the radio channel is short. Although 3GPP standards have adopted closed loop transmit diversity (CLTD) for some purposes, they have not adopted it for use on the F-DPCH.

SUMMARY OF THE INVENTION

We have provided a method in which, for example, each user is allocated two slot formats within a given slot, so that the symbol to be transmitted to the user can be transmitted from the respective transmit antennas of the base station at separated instants of time.

Accordingly, in an embodiment, we have provided a communication method for use in a network in which users are allocated respective symbol positions within timeslots for communication to the respective users from a base station. The method comprises, from a base station transmitter, periodically transmitting a signal representing coded information to a user terminal from at least two antennas belonging to the same base station. The signal is transmitted within each of a plurality of periodic timeslots. Within each timeslot, each antenna transmits the same coded information only during an assigned symbol position. The symbol positions assigned to the respective antennas are separated in time according to a specified sequential spacing of symbol positions within the timeslot.

In another embodiment, a communication method comprises, at a user terminal, periodically receiving signals from at least two antennas belonging to the same base station. A signal containing the same coded information is received from each respective antenna only during a corresponding symbol position within each of a plurality of periodic timeslots. The method further comprises recovering the signal values using knowledge of a specified sequential spacing of symbol positions within each timeslot, according to which the symbol positions corresponding to the respective antennas are separated in time.

DETAILED DESCRIPTION

The problem of destructive interference can be avoided by transmitting the same TPC symbol from each of two or more antennas to each UE on its designated F-DPCH, but with a separation in time between the respective antennas. To achieve the separation in time, a different slot format (as defined, e.g., in 3GPP) may be used for each transmit antenna. Thus, in a 3GPP 25.211 system with a two-antenna transmit array, for example, the TPC symbol may be positioned in any one of ten symbol positions on the main antenna, and in any one of ten positions on the diversity antenna. Accordingly, the TPC symbols on the respective antennas may be sent in temporal alignment—i.e. in the same symbol position on each antenna—as currently defined in 3GPP, or with an offset so that they are separated in time. More generally, the respective symbol positions may be selected to provide a specified sequential spacing within the timeslot for any number of antennas up to and including the total number of available symbol positions per timeslot.

Accordingly, one possible approach is to assign the first format to the main antenna according to existing protocols, and to add a new mechanism for assigning the second slot to the diversity antenna (or for assigning plural slots beyond the first slot to plural antennas beyond the main antenna, if more than two antennas are to be used).

Figure 1:
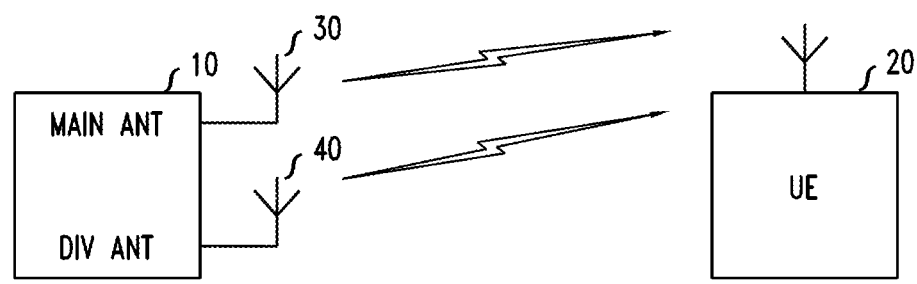
FIG. 1 is a simplified block diagram of a portion of a wireless network including a base station having two transmit antennas.
Figure 2:
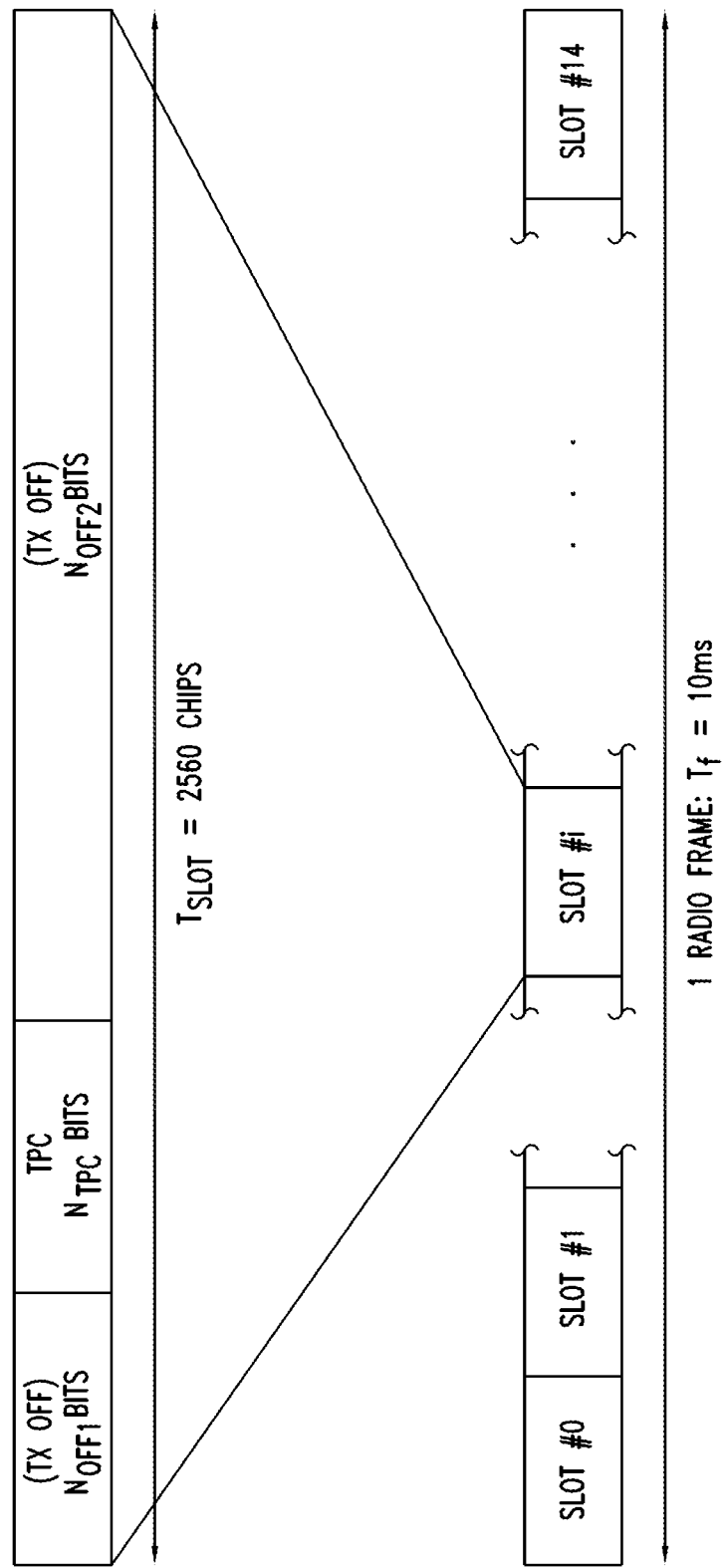
FIG. 2 is a timing diagram of a radio frame of the fractional dedicated physical channel (F-DPCH) according to the standard 3GPP 25.211 showing, in a detail, the use of allocated slot formats to send a transmission power control (TPC) command to designated user terminals.
Figure 3:
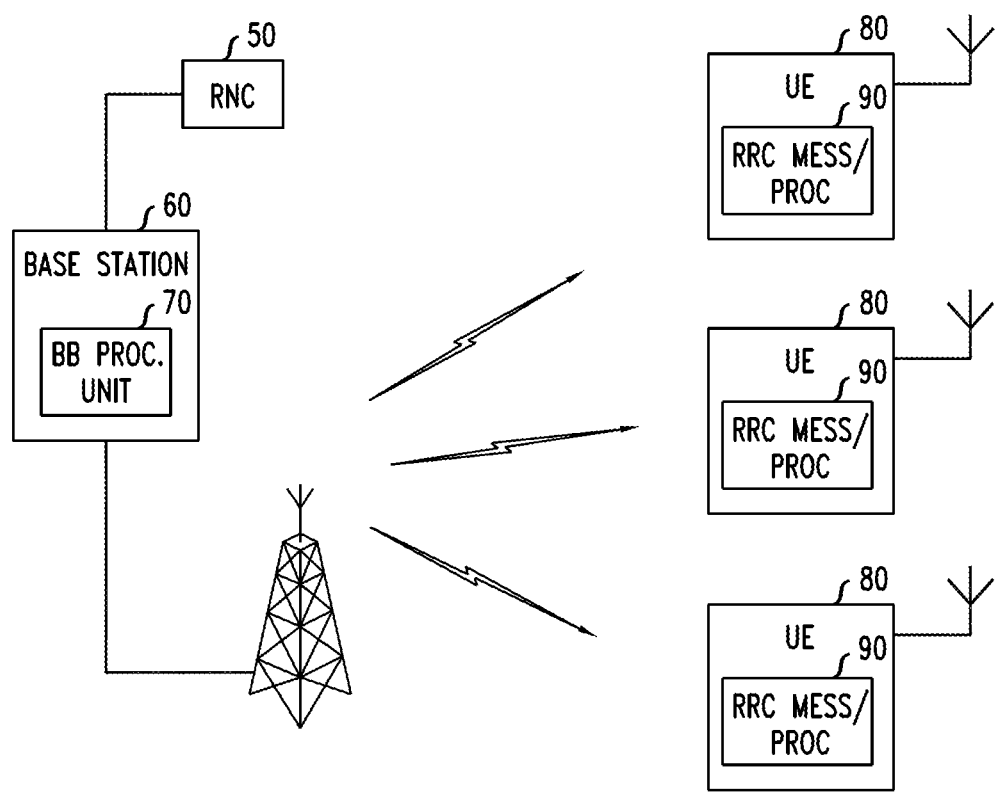
FIG. 3 is a simplified block diagram of a portion of an illustrative wireless network, showing the flow of signals for controlling format on the F-DPCH.

FIG. 3, to which reference is now made, shows selected elements in an illustrative wireless network. By way of example and without limitation, the allocation of slot formats to UEs may be made at the radio network controller (RNC) 50 and communicated via signaling to the base station 60, where the information is stored in the baseband processing unit 70 for use in physically assembling the slots for transmission. The RNC may also signal the slot-format allocation to the UEs 80 by way of the base station, so that each UE can anticipate when, during each slot, its destined messages will arrive. At the UE, this information may be stored and applied in, for example, the radio resource control (RRC) messaging/processing unit 90.

To reduce interference, it, is desirable to avoid using the same OVSF code (or other orthogonal or quasi-orthogonal code) for making two simultaneous transmissions from the base station to different users. In particular, it would generally be undesirable to use the same code to transmit to a second user on a second antenna during the symbol time in which the TPC command is transmitted to a first user on a first antenna. However, taking the two-antenna case as an example, prohibiting such simultaneous transmissions would double the time per user consumed by a signal sent on the F-DPCH, i.e., the time per user would increase from one symbol interval as defined by current 3GPP implementations to two symbol intervals. This, in turn, would reduce the maximum number of users who can share a given OVSF code from 10 (for example) to 5, if all users are employing transmit diversity.

This may have adverse consequences for capacity gain. That is, antenna diversity tends to increase capacity gain because soft combining of signals originating at different antennas tends to improve network performance. Such soft combining may take place, for example, in a diversity receiver at the UE, and may be advantageous even if the UE has only one antenna.

However, there will always be only a finite number of OVSF codes. If a given code is shared among fewer users, the set of codes available for assignment to new users will be depleted more rapidly. As this set approaches exhaustion, the number of users that can be added to the system may be limited. Such an eventuality may limit the capacity gain otherwise achievable through antenna diversity.

To overcome the disadvantage described above, timeslots may be mapped to users in a time-multiplexed fashion. That is, the TPC command is sent to a given UE only in designated timeslots, and not in all F-DPCH slots as prescribed by the standards currently in force. For example, a cycle of k F-DPCH slots may be defined. The TPC command is then sent to the given UE in only one slot per cycle of k F-DPCH slots, with the remaining k−1 slots per cycle being turned "off" with respect to that UE, but available for transmission to other UEs (using inter alia the same OVSF code).

By way of example and without limitation, the value of k may be chosen at the RNC, which transmits it to the base station and, via the base station, to the UE. At the base station, this information may be stored and applied in the baseband processing unit, and at the UE, it may be stored and applied in the RRC messaging/processing unit.

Thus, for k=2 for example, two users share the same symbol locations of the same OVSF code, but they use alternate slots, with transmissions to one user taking place in odd-numbered slots, and transmissions to the other user taking place in even-numbered slots. (For simplicity, it is assumed here that a frame contains an even number of slots. Later, we will discuss implementations in which a frame contains fifteen slots as prescribed under versions of 3GPP standards currently in force.) With reference to the example given above, one consequence is that because five users can share a given OVSF code in the odd-numbered slots and five different users can do the same in the even-numbered slots, the total number of users who can share a given OVSF code is restored to ten. In fact, if k is made greater than the number of sequenced antenna transmissions per TPC command, even more F-DPCH users can be supported (per F-DPCH OVSF code) than are supported under the standards currently in force.

Those skilled in the art will recognize that setting k to a value greater than 1 may reduce the rate at which the power-control loop is updated. However, we believe that in many practical networks, greater dependability in the reception of TPC commands will compensate any resultant loss in performance. That is, for the UE transmit power to track the network dynamics accurately, the latency in the control loop should be less than the fading interval for the fastest-moving UEs, but it is at least as important that the UEs reliably and accurately receive the TPC commands. By improving the second of these factors, we believe that our approach will generally produce a net benefit, even if the first factor is less than optimal.

The value designated for k may be a fixed value, or it may be variable. For example, a variable k may be chosen separately for each user, and adapted in response to any of various factors that affect performance, such as user mobility. Thus, for example, lower values of k may be assigned to users currently moving at high speed, and higher values assigned to users who are currently stationary or moving at low speed.

As explained above, the TPC command is advantageously transmitted once within the same timeslot from each antenna of, e.g., a two-antenna array, with a timing offset between the respective transmissions. Suppose, for example, that the timing offset has a fixed value of 5 symbol positions. The particular choice of 5 is advantageous at least for the purpose of providing time diversity because (if there are a total of ten slot formats) it maximizes the separation in time between successive antenna transmissions addressed to the same UE. In that case, a UE having an F-DPCH slot format of n on the main antenna would expect an F-DPCH slot format of (n+5) mod 10 on the diversity antenna when transmit diversity is enabled for that UE. The sequential position must be taken modulo 10, at least under current 3GPP standards, because the standards define a sequence of ten F-DPCH slot formats respectively numbered 0, 1, 2, . . . , 9.

More generally, a variable j may be used to designate the F-DPCH slot format transmitted to a UE on the diversity antenna. The variable j may be signaled explicitly, or it may be determined implicitly based, e.g., on an offset i to the 3GPP-defined slot format n assigned to the main antenna. If j is determined implicitly, the offset i may be either fixed or programmable. If n is the 3GPP F-DPCH slot format on the main antenna, then the corresponding value of j for the 3GPP F-DPCH slot format to be transmitted to the UE on the diversity antenna would be determined as j=(n+i) mod 10.

Accordingly, if transmit diversity is enabled for a given UE, and further, if a non-zero offset is designated, then the TPC command to the given UE as transmitted from the respective antennas will be separated in time, and the given UE will deterministically know the pertinent F-DPCH slot format used on the diversity antenna. It should be noted in this regard that if the Value "0" is designated for the offset, the same F-DPCH slot will be supported on both the main antenna and the auxiliary antenna. In this manner, there is support for backward compatibility with the implementations as defined in current versions of the 3GPP standards.

As noted above, the F-DPCH slots may be time-multiplexed such that two different UEs use the same channel, but on alternate slots. In current implementations of 3GPP, one 10-ms frame has fifteen slots. Consequently, one of the two UEs will use odd numbered slots on frame 1 and even numbered slots on frame 2, and vice versa for the other UE. Thus, the complete pattern will repeat after each cycle of two frames. As noted above, the F-DPCH slots may more generally be time-multiplexed such that every k'th slot is targeted toward a given UE. The parameter k may take any positive integer value, but may not be so large that, as a practical matter, the power control loop becomes too slow to track the dynamics of the network, and network performance consequently begins to suffer.

Figure 4:
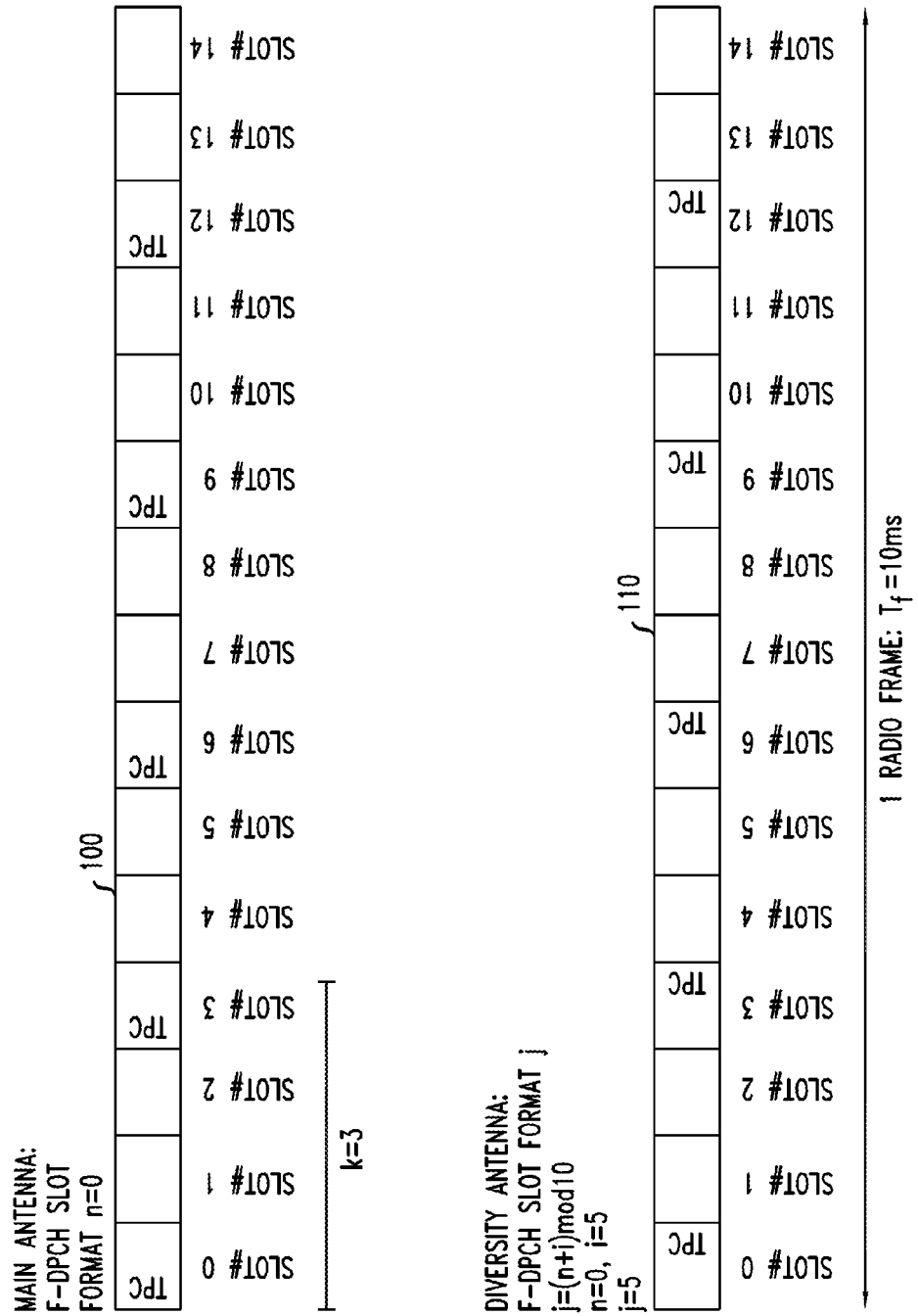
FIG. 4 is a timing diagram showing the use of two mutually offset slot formats within an F-DPCH slot to transmit the TPC command to a designated user terminal according to an embodiment of the methods described here.

FIG. 4, to which attention is now directed, is a timing diagram for the case n=0, i=5, k=3. Accordingly, it will be seen in main antenna sequence 100 of the figure that the TPC command is transmitted from the main antenna in slot format 0 in every third slot, i.e., in the slots numbered 0, 3, 6, etc. Meanwhile, with reference to diversity antenna sequence 110, the same TPC command is transmitted from the diversity antenna in the same slots, but in slot format j=5.

It will be understood from what has been said above that within a given slot, the combination of a given slot format and a given OVSF code can be assigned to only one UE, and may not be used by any other UE within the same cell. In the (two-antenna) examples described above, the diversity antenna is silent while the main antenna is transmitting to the given UE, and vice versa. (In this regard, "silence" relates only to the given UE. The diversity antenna may be transmitting to another UE on a different code.)

However, the main and diversity antennas can transmit simultaneously to the same user. That is, it would be possible for both the main antenna and the diversity antenna to transmit simultaneously to the given UE on the same OVSF code. In the event that the timing offset between the antennas is non-zero, both antennas can transmit twice: once on the slot format assigned to the main antenna, and a second time on the slot format assigned to the diversity antenna. This can be done without interfering with other UEs in the cell, for the reason stated above, i.e., that once it has been assigned to a given UE, the combination of a given slot format and a given OVSF code may not be used by any other UE within the same cell.

As a consequence, it is possible, when the timing offset between antennas is non-zero, for the base station to transmit the TPC commands using space-time block coding based transmit diversity (STTD). STTD is a communication method which seeks to make reception more reliable by transmitting multiple copies of a data stream across multiple antennas using space-time block codes. The block codes may be orthogonal codes, or they may be quasi-orthogonal codes that seek to increase date rates at the cost of higher inter-symbol interference.

An example of a space-time block code is the Alamouti code, expressed in terms of complex symbols $c_1$ and $c_2$ that are to be transmitted, by $$C = \begin{bmatrix} c_1 & c_2 \\ -c_2^* & c_1^* \end{bmatrix}$$

wherein each column of the code matrix C represents a respective one of the two transmit antennas, and each row represents a respective symbol interval during which a symbol transmission takes place. In the notation used here, c* denotes the complex conjugate of c.

Accordingly, it will be understood that when a 2×2 space-time block code matrix is transmitted, the symbol pair $(c_1, c_2)$ is transmitted twice: in the first symbol interval, each symbol is transmitted from a respective antenna, and then the symbols are transposed between antennas for retransmission in the second symbol interval. As shown above for the Alamouti code, the two instances of transmission of the same symbol may differ by complex conjugation and/or by sign reversal (i.e. by a phase shift of $\pi$ radians).

In an embodiment, our new approach uses STTD to transmit the TPC commands. More specifically, the TPC command for a given timeslot is encoded as two symbols $s_1$ and $s_2$, which contain different but complementary encoded information. In accordance with the methods of STTD, the two symbols are transmitted from the respective antennas in the first symbol interval, transposed, and transmitted again from respective antennas in the second symbol interval. The offset between the first and second symbol intervals may optionally be set so that the symbol positions used for transmission are adjacent to each other, but it may alternatively be set so that they are non-adjacent.

Space-time block codes for three or more antennas are also known, and extension of the ideas discussed above to STTD using such larger antenna arrays is straightforward. In general, it will be preferable for the number of antennas used for transmission to be at least equal to the number of symbol positions within a timeslot that are used for transmission.

The invention claimed is:

1. A communication method for use in a network in which a plurality of user terminals are allocated respective symbol positions within timeslots for communication to at least one of the plurality of user terminals from a base station, comprising:
periodically transmitting, from the base station, a signal representing coded information to the at least one of the plurality of user terminals utilizing at least two antennas belonging to the base station, the signal being transmitted within each of a plurality of periodic timeslots, the plurality of periodic timeslots being determined based on at least a mobility of the plurality of user terminals, each of the at least two antennas transmitting same coded information only during a symbol position assigned to each of the at least two antennas, the assigned symbol positions being separated in time according to a specified sequential spacing of symbol positions within the timeslot.

2. The method of claim 1, wherein the at least one of the plurality of user terminals is served by the base station, and
the periodically transmitted signal is transmitted on an orthogonal or quasi-orthogonal code designated for communication with a limited set of one or more user terminals including the at least one of the plurality of user terminals.

3. The method of claim 1, wherein the specified sequential spacing of symbol positions is characterized by a fixed offset between said symbol positions.

4. The method of claim 1, wherein the specified sequential spacing of symbol positions is characterized by a programmable offset between said symbol positions.

5. The method of claim 4, wherein a value of the programmable offset is signaled explicitly.

6. The method of claim 4, further comprising:
computing a value of the programmable offset from received information.

7. The method of claim 1, further comprising:
receiving an on/off indicator for antenna diversity, and performing the periodic transmitting in response to a determination that a value of "on" for the antenna diversity has been indicated.

8. The method of claim 1, wherein the signal is transmitted within each timeslot in a contiguous sequence of periodic timeslots.

9. The method of claim 1, wherein the signal is transmitted within each timeslot in a periodic but non-contiguous sequence of timeslots.

10. The method of claim 9, wherein the periodic but non-contiguous sequence of timeslots including a period of k contiguous timeslots, wherein k is an integer with a value of at least 2.

11. The method of claim 1, wherein:
a number of antennas is an integer n with a value of at least 2;
a number of sequentially spaced symbol positions within each timeslot is at least 2 and at most n; and
a total of two or more signals containing different coded information are transmitted in each timeslot, each said signal being repeated from each of the at least two antennas according to the specified sequential spacing of symbol positions within the timeslot.

12. The method of claim 11, in which the two or more signals are transmitted in accordance with a space-time block code.

13. The method of claim 1, wherein the coded information is a Transmission Power Control (TPC) command.

14. A communication method for use in a network in which a plurality of user terminals are allocated respective symbol positions within timeslots for communication to at least one of the plurality of user terminals from a base station, comprising:
periodically receiving, at the at least one of the plurality of user terminals, a plurality of signals from at least two antennas belonging to the same base station, at least one of the plurality of signals containing same coded information being received from each of the at least two antennas only during a corresponding symbol position within each of a plurality of periodic timeslots, the plurality of periodic timeslots being determined based on at least a mobility of the plurality of user terminals; and
recovering signal values, at the at least one of the plurality of user terminals, using a knowledge of a specified sequential spacing of symbol positions within each of the plurality of periodic timeslot, according to which the symbol positions corresponding to each of the at least two antennas are separated in time.

15. The method of claim 14, wherein the recovering is carried out in a receiver configured for receiving space-time block codes.

16. The method of claim 14, wherein the signal values are recovered using a diversity receiver.

17. The method of claim 14, wherein the recovered signal values are Transmission Power Control (TPC) commands.

18. The method of claim 14, wherein the recovering signal values further comprises:
despreading the plurality of signals from an orthogonal or quasi-orthogonal code.

19. The method of claim 14, wherein the signal values are recovered within each of a contiguous sequence of periodic timeslots.

20. The method of claim 14, wherein the signal values are recovered within each of a periodic but non-contiguous sequence of timeslots.

21. A communication method for use in a network in which a plurality of user terminals are allocated respective symbol positions within timeslots for communication to at least one of the plurality of user terminals from a base station, comprising:

periodically transmitting, from the base station, a signal representing coded information to the at least one of the plurality of user terminals utilizing at least two antennas belonging to the base station, the signal being transmitted within each of a plurality of periodic but non-contiguous sequence of timeslots, each of the at least two antennas transmitting same coded information only during an assigned symbol position of each of the at least two antennas, the assigned symbol positions of the at least two antennas being separated in time according to a specified sequential spacing of symbol positions within the timeslot, the periodic but non-contiguous sequence of timeslots including a period of k contiguous timeslots with k being an integer with a value of at least 2.

22. A communication method for use in a network in which a plurality of user terminals are allocated respective symbol positions within timeslots for communication to at least one of the plurality of user terminals from a base station, comprising:

periodically receiving, at the at least one of the plurality of user terminals, a plurality of signals from at least two antennas belonging to the same base station, at least one of the plurality of signals containing same coded information being received from each of the at least two antennas only during a corresponding symbol position within each of a plurality of periodic but non-contiguous timeslots; and recovering signal values, at the at least one of the plurality of user terminals, using a knowledge of a specified sequential spacing of symbol positions within each of the plurality of periodic but non-contiguous timeslots, according to which the symbol positions corresponding to each of the at least two antennas are separated in time, the periodic but non-contiguous sequence of timeslots including a period of k contiguous timeslots with k being an integer with a value of at least 2.

* * * * *